(12) United States Patent
Higgins et al.

(10) Patent No.: US 6,987,630 B1
(45) Date of Patent: Jan. 17, 2006

(54) METHOD AND APPARATUS FOR MEDIA THERMAL DECAY MEASUREMENT IN A DISK DRIVE

(75) Inventors: Bill Higgins, Palo Alto, CA (US); Bruce Schardt, Tracy, CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 10/366,582

(22) Filed: Feb. 12, 2003

Related U.S. Application Data (60) Provisional application No. 60/356,905, filed on Feb. 12, 2002.

(51) Int. Cl.
 G11B 27/36  (2006.01)
 G11B 5/02  (2006.01)

(52) U.S. Cl. .......................................... 360/31; 360/25

(58) Field of Classification Search ................ 360/31; 324/210, 211, 212, 224, 252; 73/105
 See application file for complete search history.

(56) References Cited

U.S. PATENT DOCUMENTS

| | | | |
|---|---|---|---|
| 5,923,485 A | 7/1999 | Ito | 360/31 |
| 6,147,488 A | 11/2000 | Bamba et al. | 324/210 |
| 6,429,984 B1 | 8/2002 | Alex | 360/31 |
| 2003/0067697 A1 * | 4/2003 | Weinstein et al. | 360/31 |

OTHER PUBLICATIONS

Dhagat, P. et al.; "sub-millisecond Spin-stand Measurements of Thermal Decay in Magnetic Recordings"; Submitted IEEE Trans. Magn., Mar. 5, 1999.

Toigo, "Avoiding a Data Crunch," *Scientific American*, May 2000, pp. 57, 59-61, 64-67 and 70-74.
U.S. Appl. No. 09/791,056, filed Feb. 21, 2001, Cross.
U.S. Appl. No. 09/879,289, filed Jun. 11, 2001, Himle et al.

\* cited by examiner

*Primary Examiner*—David Hudspeth
*Assistant Examiner*—Daniel L. Negron
(74) *Attorney, Agent, or Firm*—Tejpal S. Hansra (57) ABSTRACT

A method and apparatus is provided for measuring a media thermal decay rate for a disk in a disk drive. In one embodiment, reference patterns are written in a plurality of reference sectors on a test track of a disk surface. A thermal decay measurement duration is predetermined. After at least two decades of time longer than the predetermined thermal decay measurement duration have passed since writing the reference patterns in the plurality of reference sectors, sector-under-test patterns are written in a plurality of sectors-under-test, wherein the sectors-under-test and the reference sectors are written in data sectors and alternate with one another about at least a portion of the test track. The mean square error is measured and averaged for the reference sectors, and the mean square error is measured and averaged for the sectors under test. The averaged mean square error for the reference sectors and the averaged mean square error for the sectors-under-test are used to calculate the media thermal decay rate. In another embodiment, information associated with the amplitude of the readback signal is used instead of, or in addition to, the mean square error of the readback signal to calculate the media thermal decay rate.

51 Claims, 4 Drawing Sheets

FIG. 1

FIG. 1(a) WRITING INFORMATION DATA

FIG. 1(b) WRITING CURRENTS

FIG. 1(c) MEDIUM MAGNETIZATIONS

READING

FIG. 1(d) MAGNETIC FLUX CHANGES IN READ HEAD

FIG. 1(e) WAVE FORMS OF READ VOLTAGE

METHOD AND APPARATUS FOR MEDIA THERMAL DECAY MEASUREMENT IN A DISK DRIVE

CROSS-REFERENCE TO RELATED APPLICATIONS

Priority is claimed from U.S. Provisional Patent Application Ser. No. 60/356,905 filed Feb. 12, 2002, which is incorporated herein by reference in its entirety.

FIELD OF THE INVENTION

The present invention relates to magnetic storage devices and, more particularly, to computer disk drives. More specifically, the present invention relates to a method and apparatus for media thermal decay measurement in a disk drive.

BACKGROUND OF THE INVENTION

Computer disk drives store digital information on magnetic disks which are coated with a magnetic material that is capable of changing its magnetic orientation in response to an applied magnetic field. Typically, the digital information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

More specifically, during operation of a conventional disk drive, a magnetic transducer is placed above a desired track of the disk while the disk is spinning. Writing is performed by delivering a write signal having a variable current to the transducer while the transducer is held close to the track. The write signal creates a variable magnetic field at a gap portion of the transducer that induces magnetic polarity transitions into the desired track which constitute the data being stored.

Reading is performed by sensing the magnetic polarity transitions on the rotating track with the transducer. As the disk spins below the transducer, the magnetic polarity transitions on the track present a varying magnetic field to the transducer. The transducer converts the varying magnetic field into an analog read signal that is delivered to a read channel for appropriate processing. The read channel converts the analog read signal into a properly-timed digital signal that can be recognized by a host computer system.

The transducer can include a single element, such as an inductive read/write element for use in both reading and writing, or it can include separate read and write elements. Typically, transducers include separate elements for reading and writing. Such transducers are known as dual element heads and usually include a magneto-resistive (MR) read element or giant magneto-resistive (GMR) read element for performing the read function.

Dual element heads are advantageous because each element of the transducer can be optimized to perform its particular function. For example, MR read elements are more sensitive to small variable magnetic fields than are inductive heads and, thus, can read much fainter signals from the disk surface. Because MR elements are more sensitive, data can be more densely packed on the surface with no loss of read performance. MR read elements generally include a stripe of magneto-resistive material that is held between two magnetic shields. The resistance of the magneto-resistive material varies almost linearly with applied magnetic field. During a read operation, the MR stripe is held near a desired track, with the varying magnetic field caused by the magnetic transitions on the track. A constant DC current is passed through the stripe resulting in a variable voltage across the stripe. By Ohm's law (i.e., V=IR), the variable voltage is proportional to the varying resistance of the MR stripe and, hence, is representative of the data stored within the desired track. The variable voltage signal (which is the analog read signal) is then processed and converted to digital form for use by the host. GMR read elements operate in a similar manner.

FIGS. 1(a)–1(e) are simplified diagrammatic representations which illustrate how data is written as transitions on a disk surface and how the transitions are read from the disk surface as data. As background, a transition is where the magnetization in the disk media changes. In general, there are two types of transitions possible; that is, where south poles face south poles and where north poles face north poles.

Figure 1:
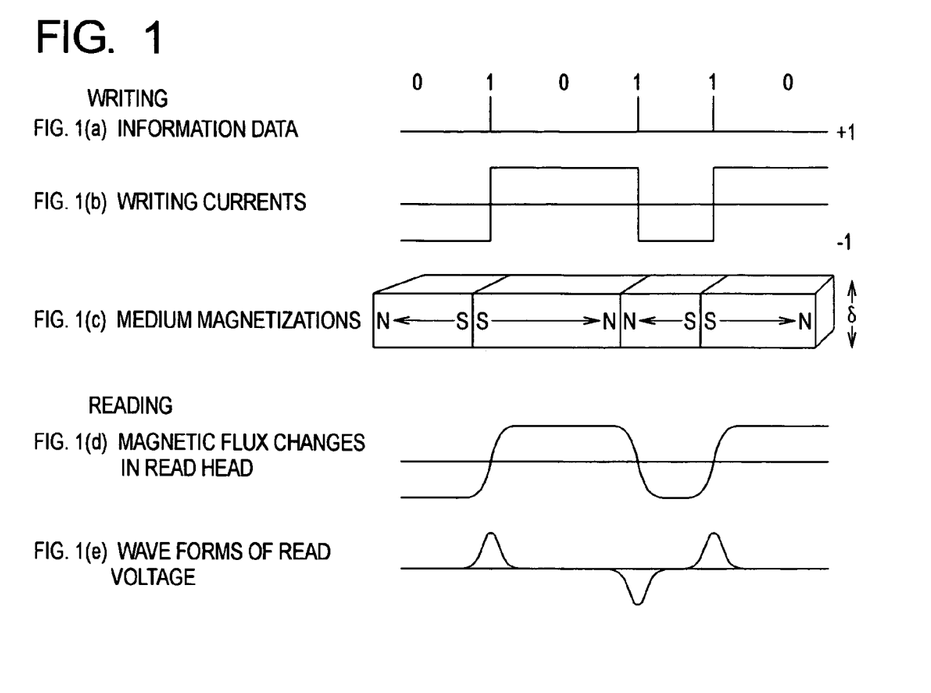
FIGS. 1(a)–(e) are simplified diagrammatic representations which illustrate the process of writing data as transitions on a disk surface and the process of reading transitions from the disk surface as data.

FIGS. 1(a)–(c) illustrate the write process in simplified form. Specifically, FIG. 1(a) illustrates a data sequence in the form of "ones" and "zeros," which is to be stored on the disk media. FIG. 1(b) illustrates the write current in the write coil for one method of storing the data sequence. In such method, the current through the write coil is reversed at each "one" and remains the same at each "zero" (see FIGS. 1(a) and 1(b)). Consequently, as the disk media is rotated under the write head, the disk media is magnetized as shown in FIG. 1(c). It should be noted that magnetic transitions occur at each "one" and not at each "zero." It should also be noted that FIG. 1(c) represents the magnetization of the media for a portion of a track, which is shown in a linear rather than arcuate shape, as will be understood by those skilled in the art.

FIGS. 1(d) and 1(e) illustrate the read process in simplified form. As mentioned above, as the disk media is rotated under the read head, a constant DC current is passed through the MR stripe in the read head. The magnetic transitions stored in the disk media cause the magnetic field applied to the MR stripe in the read head to vary, as shown in FIG. 1(d). Since the resistance of the magneto-resistive material varies almost linearly with applied magnetic field, the varying magnetic field caused by the magnetic transitions on the disk media results in a variable voltage across the stripe. By Ohm's law (i.e., V=IR), the variable voltage is proportional to the varying resistance of the MR stripe and, hence, is representative of the data stored within the desired track, as shown in FIG. 1(e). The variable voltage signal (which is the analog read signal) is then processed and converted to digital form for use by the host.

The amount of information capable of being stored on a disk surface is determined, in part, by the minimum size of individual transitions. As is known to those skilled in the art, the minimum size of individual transitions is based (among other things) upon the grain size of the magnetic material forming the magnetic layer of the disk surface. In order to increase the amount of information capable of being stored on the disk surface, disk manufacturers have been continuously reducing the grain size of the magnetic material and, hence, have reduced the minimum size of individual transitions. For the magnetic layer of the disk, the remnant magnetization-thickness product has also been reduced to achieve higher linear densities and enhanced writer performance. Most of this reduction has been achieved by reducing the thickness of the magnetic layer of the disk, and hence, the grain thickness, which reduces the grain size.

Traditionally, about 500 to 1000 grains of magnetic material were required to store a bit of information. However, at present, a transition may be stored in about 250 grains of magnetic material, assuming a density of 25 Gb/in$^2$. It is expected that the number of grains of magnetic material required to store a bit of information will continue to decrease over time. To reduce transition noise and increase the number of grains in a transition, both the diameter of the grains and the separation between the grains have been decreased. In fact, the diameter of the grains has decreased from approximately 15 nm down to approximately 9–10 nm. This has driven disk vendors to produce disks with smaller grain volumes.

As will be understood by those skilled in the art, each grain has a certain magnetic anisotropy energy associated with it. More specifically, the anisotropy energy of a grain is a fixed amount of energy required to "hold" a stored direction of magnetization in the magnetic material. As grain sizes have been reduced, the anisotropy energy associated with each grain has been reduced. In fact, the anisotropy energy of each grain has been reduced such that it is comparable to the ambient thermal energy in the disk drive. Consequently, the thermal energy in the disk drive randomly excites grains in the magnetic material causing changes in the direction of magnetization of the magnetic material over time. Ultimately, if a threshold number of grains change their direction of magnetization, information stored on the disk may be lost. This phenomenon is known as the superparamagnetic effect or media thermal decay.

In other words, the superparamagnetic effect is a thermal relaxation of information stored on the disk surface. Because the superparamagnetic effect may occur at room temperature, over time, information stored on the disk surface will begin to decay. Once the stored information decays beyond a threshold level, it will be unable to be properly read by the read head and the information will be lost.

The superparamagnetic effect manifests itself by a loss in amplitude in the readback signal over time or an increase in the mean square error (MSE) of the read back signal over time. In other words, the readback signal quality metrics are means square error and amplitude as measured by the read channel integrated circuit. Decreases in the quality of the readback signal cause bit error rate (BER) increases. As is well known, the BER is the ultimate measure of drive performance in a disk drive.

Thermal decay rates are often expressed as a percent decrease per decade of time. For example, if an original amplitude is 100% at 1 second and the thermal decay rate is 1% per decade, after 10 seconds the amplitude will be 99% of its original and after 100 seconds the amplitude will be 98% of its original, and so on.

Disk drive manufacturers have attempted to design media that is "stable." That is, manufacturers have attempted to design disks which have micro-magnetic properties such that disks are not subject to media thermal decay. However, as noted above, the path of progress has been against stable media (e.g., grain sizes are being reduced to allow more information to be stored on a disk surface). As a tradeoff, disk drive manufacturers have resorted to designing disks which attempt to keep media thermal decay rates to manageable levels given the overall lifetime of a disk drive.

Because media thermal decay rates can vary on a disk-by-disk basis, even among disks designed by the same manufacturer, it is beneficial to take media thermal decay measurements for each disk of a disk drive to ensure that design requirements have been met for all of the disks within a drive. Media thermal decay measurements can be made for each disk in a disk drive by taking spin stand measurements. However, spin stand measurements are largely disfavored because expensive pieces of equipment are tied-up for long periods of time (e.g., many hours), thereby increasing overall manufacturing costs and, hence, the cost of disk drives to end users.

Accordingly, it would be desirable to develop a technique for measuring media thermal decay rates of a disk drive on a disk-by-disk basis, which does not require spin stand measurements. Furthermore, it would be desirable if such technique could provide media thermal decay measurements in a relatively short period of time.

SUMMARY OF THE INVENTION

The present invention is designed to meet the aforementioned, and other, needs. The invention is directed to a method and apparatus for measuring a media thermal decay rate for a disk in a disk drive. In one embodiment, reference patterns are written in a plurality of reference sectors on a test track of a disk surface. A thermal decay measurement duration is predetermined. After at least two decades of time longer than the predetermined thermal decay measurement duration have passed since writing the reference patterns in the plurality of reference sectors, sector-under-test patterns are written in a plurality of sectors-under-test, wherein the sectors-under-test and the reference sectors are written in data sectors and alternate with one another about at least a portion of the test track. The mean square error is measured and averaged for the reference sectors, and the mean square error is measured and averaged for the sectors under test. The averaged mean square error for the reference sectors and the averaged mean square error for the sectors-under-test are used to calculate the media thermal decay rate. In another embodiment, information associated with the amplitude of the readback signal is used instead of, or in addition to, the mean square error of the readback signal to calculate the media thermal decay rate.

Other embodiments, objects, features and advantages of the invention will be apparent from the following specification taken in conjunction with the following drawings.

DETAILED DESCRIPTION OF THE PREFERRED EMBODIMENT

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 2:
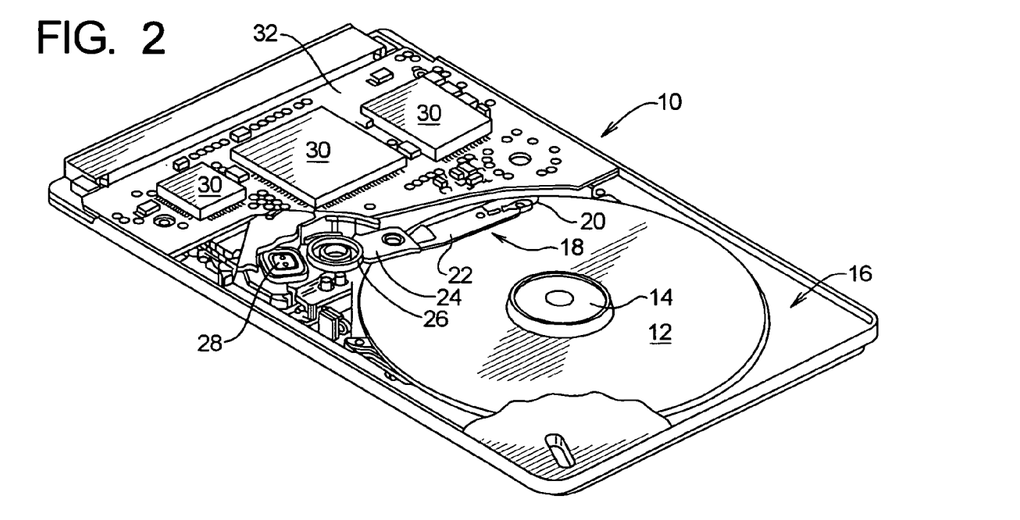
FIG. 2 is a diagrammatic representation of a disk drive in which the present invention may be implemented.

A disk drive 10 with which the present invention may be used is illustrated in FIG. 2. The disk drive comprises a disk 12 that is rotated by a spin motor 14. The spin motor 14 is mounted to a base plate 16.

The disk drive 10 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 relative to the disk 12. The spin motor 14, voice coil motor 28 and head 20 are coupled to a number of electronic circuits 30 mounted to a printed circuit board 32. Among other things, the electronic circuits 30 include a read channel chip, a microprocessor-based controller and a random access memory (RAM) device.

It should be understood that the disk drive 10 may include a plurality of disks 12 and, therefore, a plurality of corresponding actuator arm assemblies 18. It should also be understood that the principles described herein are equally applicable to such disk drives.

Figure 3:
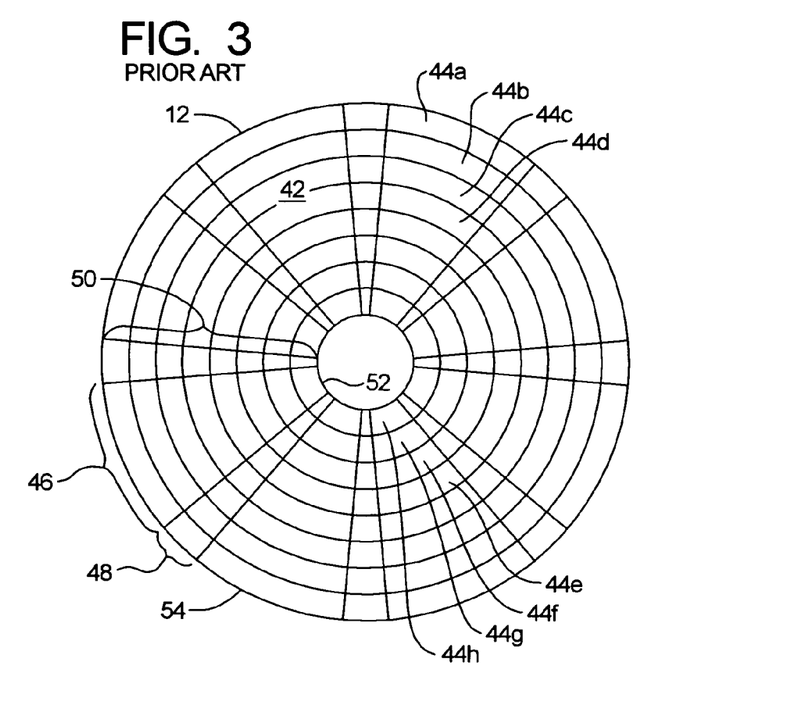
FIG. 3 is a diagrammatic representation illustrating a disk surface which has been formatted to be used in conjunction with a sectored servo system.

FIG. 3 is a diagrammatic representation of a simplified top view of a disk 12 having a surface 42 which has been formatted to be used in conjunction with a conventional sectored servo system (also known as an embedded servo system). As illustrated in FIG. 3, the disk 12 includes a plurality of concentric tracks 44a–44h for storing data on the disk's surface 42. Although FIG. 3 only shows a relatively small number of tracks (i.e., 8) for ease of illustration, it should be appreciated that typically tens of thousands of tracks are included on the surface 42 of a disk 12.

Each track 44a–44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54). The servo sectors 48 are used to position the head 20 associated with each disk 12 during operation of the disk drive 10.

Figure 4:
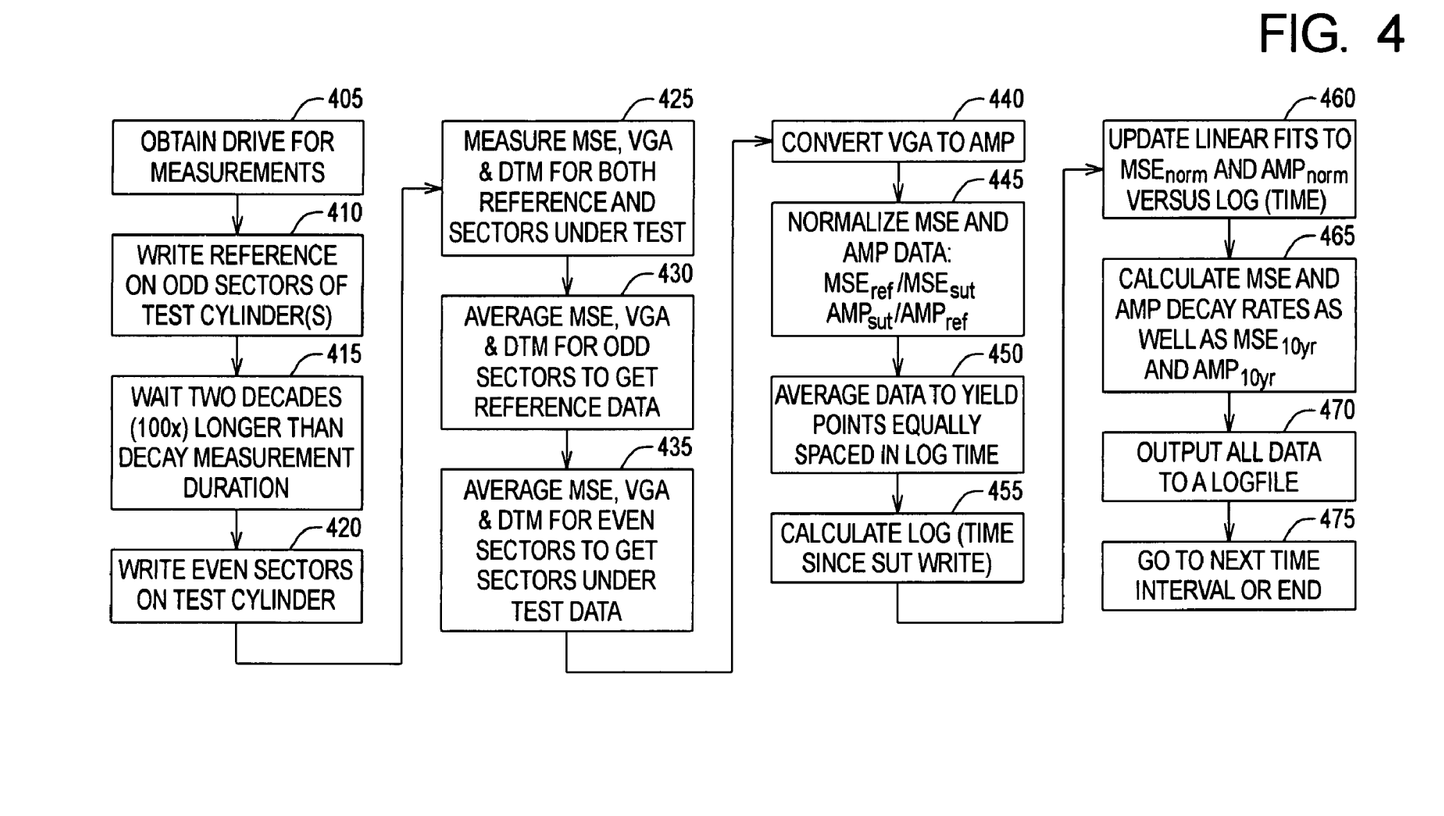
FIG. 4 is a simplified flow diagram illustrating one manner of implementing the present invention; and, FIG. 5 is a diagrammatic representation, similar to that shown in FIG. 3, that contains reference sectors and sectors-under-test, which may be used in conjunction with the present invention.
Figure 5:
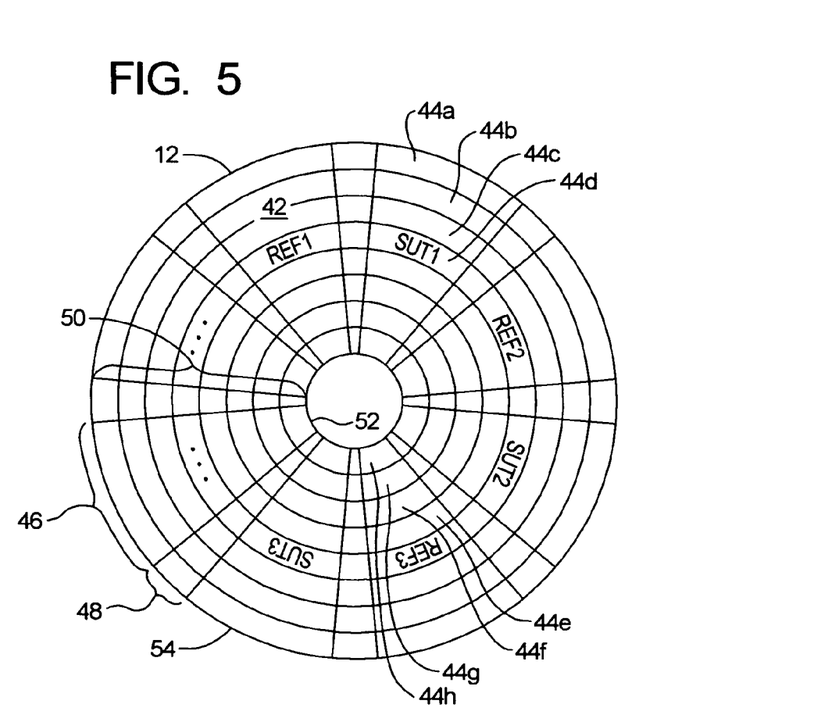

One embodiment of the present invention will be described in connection with FIGS. 4 and 5. FIG. 4 is a simplified flow diagram illustrating one method of measuring media thermal decay rates of a disk in a disk drive in which the present invention has been implemented. It should be understood that there are many other ways of implementing the present invention and FIG. 4 shows one of a number of possibilities. FIG. 5 is a diagrammatic representation, similar to that shown in FIG. 3, which contains reference sectors and sectors-under-test.

With reference to FIG. 4, in step 405, a disk drive, having one or more disks for media thermal decay rate measurement, is obtained. In step 410, one or more reference patterns are written in one or more user data sectors 46 of one or more test tracks. For ease of understanding, FIG. 4 indicates that the reference patterns are written in odd sectors of the test track; however, the reference patterns may instead be written in even sectors of the test track. FIG. 5 shows reference patterns written in reference sectors (e.g., REF1, REF2, REF3, etc.) of track 44d. The reference patterns may take many forms. In one embodiment, the reference patterns are pseudo-random data, as will be understood by those skilled in the art.

After the reference sectors have been written, a period of at least two decades of time (i.e., 100 times) longer than a predetermined decay measurement duration must be exceeded before writing sectors-under-test in even sectors of the test track (steps 415 and 420). For example, if the predetermined decay measurement duration was 1 minute, two decades of time from the predetermined decay measurement duration would be 100 minutes. The sectors-under-test (e.g., SUT1, SUT2, SUT3, etc.) are shown in FIG. 5 and also preferably include pseudo-random data. Again, for ease of understanding, FIG. 4 indicates that the patterns written in the sectors-under-test are written in even sectors of the test track; however, such patterns may instead be written in odd sectors of the test track.

The predetermined decay measurement duration is determined using an iterative process. Media thermal decay rates are measured using the techniques described herein and, through experimentation, a preferred predetermined decay measurement duration is found by determining how many samples are necessary to achieve a relatively accurate measurement. It is, in part, dependent upon the number of reference sectors and corresponding sectors-under-test that are used in performing media thermal decay measurements. It is also dependent upon processor capabilities and the spindle speed.

The inventors have determined that one minute is a preferred predetermined decay measurement duration, when using 41 reference sectors and 41 sectors-under-test. That is, in one embodiment, reference sectors and sectors-under-test are only written in alternating data sectors for a portion of the test track in order to avoid overloading the processor.

In another embodiment, the reference sectors and sectors-under-test are written in alternating data sectors of an entire track. Using the entire track will reduce the predetermined decay measurement duration, as long as the system does not suffer from processor delays. Accordingly, as processor speeds continue to increase, using an entire track of reference sectors is anticipated.

Once the sectors-under-test have been written, measurements are taken of signals available from certain registers in the channel 30 when reading both the reference sectors and the sectors-under-test (step 425). Specifically, the mean square error and a variable gain amplifier (VGA) signal (which is indicative of the amplitude of the readback signal) are measured for both the reference sectors and the sectors-under-test when reading same. Importantly, data is gathered only for a period equal to the predetermined decay measurement duration, wherein the predetermined decay measurement duration begins when the first pattern is written in the first sector-under-test.

As mentioned above, the superparamagnetic effect manifests itself by a loss in amplitude in the readback signal over time or an increase in the mean square error (MSE) of the read back signal over time. That is, the readback signal quality metrics are means square error and amplitude as measured by the read channel integrated circuit.

In steps 430 and 435, the mean square error and the VGA signal for the reference sectors are averaged, as are the mean square error and the VGA signal for the sectors-under-test. These averages are preferably performed on-the-fly. In other words, as data is being received, it is preferably (but, not necessarily) being averaged.

In step 440, the averaged values of the VGA signal for both the reference sectors and the sectors-under-test are converted, so that they reflect the average amplitude of the readback signal for both the reference sectors and the sectors-under-test. Preferably, this is also done "on-the-fly."

As will be understood by those skilled in the art, the manner of performing the conversion is specific to each read channel and is detailed in each read channel specification. In one read channel, for example, the readback signal amplitude is related to VGA by the following formula where VGA(t) is the VGA measured at time t, $A_0$ is a reference amplitude and A(t) is the amplitude at time t:

$$A(t) = A_0 10^{-24 VGA(t)/256 \times 20}$$

Next, in step 445, the mean squared error and the amplitude of the readback signal are normalized according to the following formulas:

$$MSE_{norm} = MSE_{ref}/MSE_{sut}$$

$$AMP_{norm} = AMP_{sut}/AMP_{ref}$$

The resulting data is used to plot points that are equally-spaced in log time (steps 450 and 455). More specifically, the normalized values provide information as to a position along the y-axis. Furthermore, information regarding the position along the x-axis of the plot is calculated by determining the log (base 10) of the time since the first sector-under-test was written. Timing measurements are preferably provided by a timer forming part of the electronic circuitry 30 of the disk drive 10. Importantly, data points for the mean square error and data points for the amplitude are recorded on different plots.

In step 460, linear fits of the data points on each of the plots are updated. Again, these updates are preferably performed "on-the-fly."

Next, in step 465, media thermal decay rate based upon the mean square error is calculated by determining the slope of the line used in the linear fit for the mean square error in step 460. In addition, the media thermal decay rate based upon the amplitude is calculated by determining the slope of the line used in the linear fit of the amplitude in step 460.

Furthermore, the expected mean square error value in 10 years, based upon the calculated MSE media thermal decay rate, is determined. Likewise, the expected amplitude value in 10 years, based upon the calculated amplitude media thermal decay rate, is also determined. Generally, the lifespan of a disk drive is less than 10 years, so knowing that the expected values in 10 years is helpful in determining whether media thermal decay will be a problem over the life of the disk drive.

In step 470, the calculated data is then output into a data file. This data may be made available to a disk drive manufacturer or an end user using certain special commands.

Finally, in step 475, a determination is made as to whether the predetermined decay measurement duration has been reached. If it has not, more data is gathered by repeating steps 425–470.

Advantageously, thermal decay rate measurements may be taken in a very short period of time (e.g., about 1 minute, so long as reference sectors are written in advance). This advantage can be exploited by providing multiple test tracks, so that media thermal decay measurements could be performed at various locations on the disk surface to ensure that media thermal decay rates are within specifications at such locations on the disk surface.

In one embodiment, reference sectors are written during the manufacturing process. In another embodiment, reference sectors are not written until thermal decay measurements are to be performed. In the former case, measurements could be taken faster, since the sectors-under-test could presumably be written immediately (i.e., a period which is two decades longer than the predetermined decay measurement duration would presumably have elapsed).

In one embodiment, an end-user could perform a media thermal decay test (or measurement) through use of a graphical user interface or by issuing a special command sequence. On the other hand, or in addition, the disk drive could automatically perform a media thermal decay test after a predetermined period of time and could inform an end user of potential media thermal decay problems, so that appropriate measures could be taken. Thus, the invention may be included entirely in firmware or may be implemented via a host or external computer.

In one embodiment, a temperature sensor is used to ensure that the disk drive has "warmed-up" prior to taking any measurements. Specifically, a disk drive's temperature can vary greatly, for example, depending upon where it is housed in a computer system or where it has been stored. Accordingly, a temperature measurement (e.g., a diode temperature measurement or DTM) could be made prior to performing any media thermal decay measurements. If the temperature was not above (or below) a predetermined threshold (or range), media thermal decay measurements would not be taken.

In one embodiment, only the mean square error is used to determine the media thermal decay rate. In another embodiment, only the VGA signal is used to determine the media thermal decay rate.

In yet another embodiment, both the mean square error and the VGA signal are used to determine the media thermal decay rate. In such case, the media thermal decay rate associated with the means square error will likely be different than the media thermal decay rate associated with the VGA signal (or amplitude). Based upon the particular circumstances associated with the disk drive, corrective action may be taken using either media thermal decay rate associated with the mean square error or the media thermal decay rate associated with the VGA signal (or both).

In one embodiment, at least one reference sector and one sector-under-test are provided on a test track. In another embodiment, at least five reference sectors and five sectors-under-test are provided (in an alternating fashion) on a test track. In yet another embodiment, at least 40 reference sectors and 40 sectors-under-test are provided (in an alternating fashion) on a test track.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method for determining a media thermal decay rate comprising the steps of:
   providing a disk drive having a disk surface and a head associated with the disk surface;
   predetermining a decay measurement duration;
   writing reference patterns in a plurality of reference sectors on a test track;
   after at least two decades of time longer than the predetermined decay measurement duration have passed since writing the reference patterns in the plurality of reference sectors, writing sector-under-test patterns in a plurality of sectors-under-test, wherein the sectorsunder-test and the reference sectors are written in data
sectors and alternate with one another about at least a
portion of the test track;
measuring mean square error for the reference sectors;
averaging the mean square error for the reference sectors;
measuring mean square error for the sectors-under-test;
averaging the mean square error for the sectors-under-
test;
using the averaged mean square error for the reference
sectors and the averaged mean square error for the
sectors-under-test to calculate the media thermal decay
rate.

2. The method of claim 1 further comprising the steps of:
determining a normalized mean square error by dividing
the averaged mean square error for the reference sec-
tors by the averaged mean square error for the sectors-
under-test.

3. The method of claim 2 further comprising the step of:
plotting the normalized mean square error relative to
$\log_{10}$(time since beginning the step of writing the
sectors-under-test).

4. The method of claim 3 further comprising the step of:
performing a mean square error linear fit based on the
normalized mean square error plotted relative to $\log_{10}$
(time since beginning the step of writing the sectors-
under-test).

5. The method of claim 4 further comprising the step of:
calculating the media thermal decay rate based upon a
slope of a line associated with the mean square error
linear fit.

6. The method of claim 5 further comprising the step of:
calculating an expected mean square error value in 10
years based upon the calculated media thermal decay
rate.

7. The method of claim 5 further comprising the step of:
outputting the calculated media thermal decay rate into a
data file.

8. The method of claim 5 further comprising the step of:
measuring the mean square error for the reference sectors;
averaging the mean square error for the reference sectors;
measuring the mean square error for the sectors-under-
test;
averaging the mean square error for the sectors-under-
test;
using the averaged mean square error for the reference
sectors and the averaged mean square error for the
sectors-under-test to calculate the media thermal decay
rate.

9. The method of claim 8 further comprising the steps of:
determining a normalized mean square error by dividing
the averaged mean square error for the reference sec-
tors by the averaged mean square error for the sectors-
under-test;
plotting the normalized mean square error relative to
$\log_{10}$(time since beginning the step of writing the
sectors-under-test);
performing a mean square error linear fit based on the
normalized mean square error plotted relative to $\log_{10}$
(time since beginning the step of writing the sectors-
under-test); and,
calculating the media thermal decay rate based upon a
slope of a line associated with the mean square error
linear fit.

10. The method of claim 9 further comprising the steps of:
repeating the steps in claims 8 and 9 until the predeter-
mined decay measurement duration has expired.

11. The method of claim 1, wherein reference sectors and
sectors-under-test include data sectors that alternate com-
pletely around the test track.

12. The method of claim 1, wherein the predetermined
decay measurement duration is determined experimentally.

13. The method of claim 1, wherein the reference patterns
include pseudo-random data.

14. The method of claim 1, wherein the sector-under-test
patterns include pseudo-random data.

15. The method of claim 1, including the step of:
performing a temperature measurement to verify that the
disk drive has been adequately warmed-up prior to
determining the media thermal decay rate.

16. A method for determining a media thermal decay rate
comprising the steps of:
providing a disk drive having a disk surface and a head
associated with the disk surface;
predetermining a decay measurement duration;
writing reference patterns in a plurality of reference
sectors on a test track;
after at least two decades of time longer than the prede-
termined decay measurement duration have passed
since writing the reference patterns in the plurality of
reference sectors, writing sector-under-test patterns in a
plurality of sectors-under-test, wherein the sectors-
under-test and the reference sectors are written in data
sectors and alternate with one another about at least a
portion of the test track;
measuring a variable gain amplifier signal for the refer-
ence sectors;
averaging the variable gain amplifier signal for the refer-
ence sectors;
measuring a variable gain amplifier signal for the sectors-
under-test;
averaging the variable gain amplifier signal for the sec-
tors-under-test;
using the averaged variable gain amplifier signal for the
reference sectors and the averaged variable gain ampli-
fier signal for the sectors-under-test to calculate the
media thermal decay rate.

17. The method of claim 16 further comprising the steps
of:
converting the averaged variable gain amplifier signal for
the reference sectors to an averaged amplitude of a
readback signal for the reference sectors; and,
converting the averaged variable gain amplifier signal for
the sectors-under-test to an averaged amplitude of a
readback signal for the sectors-under-test.

18. The method of claim 17 further comprising the steps
of:
determining a normalized amplitude of the readback
signal by dividing the averaged amplitude of the read-
back signal for the sectors-under-test by the averaged
amplitude of the readback signal for the reference
sectors.

19. The method of claim 18 further comprising the step of:
plotting the normalized amplitude of the readback signal
relative to $\log_{10}$(time since beginning the step of writ-
ing the sectors-under-test).

20. The method of claim 19 further comprising the step of:
performing an amplitude linear fit based on the normal-
ized amplitude relative to $\log_{10}$(time since beginning
the step of writing the sectors-under-test).

21. The method of claim 20 further comprising the step of:
calculating the media thermal decay rate based upon a
slope of a line associated with the amplitude linear fit.

22. The method of claim 21 further comprising the step of:
calculating an expected amplitude value in 10 years based upon the calculated media thermal decay rate.

23. The method of claim 21 further comprising the step of:
outputting the calculated media thermal decay rate into a data file.

24. The method of claim 21 further comprising the step of:
measuring the variable gain amplifier signal for the reference sectors;
averaging the variable gain amplifier signal for the reference sectors;
measuring the variable gain amplifier signal for the sectors-under-test;
averaging the variable gain amplifier signal for the sectors-under-test;
using the averaged variable gain amplifier signal for the reference sectors and the averaged variable gain amplifier signal for the sectors-under-test to calculate the media thermal decay rate.

25. The method of claim 24 further comprising the steps of:
determining the normalized amplitude of the readback signal by dividing the averaged variable gain amplifier signal for the sectors-under-test by the averaged variable gain amplifier signal for the reference sectors;
plotting the normalized amplitude of the readback signal relative to $\log_{10}$(time since beginning the step of writing the sectors-under-test);
performing an amplitude linear fit based on the amplitude of the readback signal plotted relative to $\log_{10}$(time since beginning the step of writing the sectors-under-test); and,
calculating the media thermal decay rate based upon a slope of a line associated with the amplitude linear fit.

26. The method of claim 25 further comprising the steps of:
repeating the steps in claims 24 and 25 until the predetermined decay measurement duration has expired.

27. The method of claim 16, wherein reference sectors and sectors-under-test include data sectors that alternate completely around the test track.

28. The method of claim 16, wherein the predetermined decay measurement duration is determined experimentally.

29. The method of claim 16, wherein the reference patterns include pseudo-random data.

30. The method of claim 16, wherein the sector-under-test patterns include pseudo-random data.

31. The method of claim 16, including the step of:
performing a temperature measurement to verify that the disk drive has been adequately warmed-up prior to determining the media thermal decay rate.

32. An apparatus for determining a media thermal decay rate comprising:
a disk drive having a disk surface;
a head associated with the disk surface,
wherein the head is used to write reference patterns in a plurality of reference sectors on a test track located on the disk surface,
wherein, after at least two decades of time longer than a predetermined decay measurement duration have elapsed since writing the reference patterns in the plurality of reference sectors, the head is used to write sector-under-test patterns in a plurality of sectors-under-test,
wherein the sectors-under-test and the reference sectors are written in data sectors and alternate with one another about at least a portion of the test track;

circuitry for measuring mean square error for the reference sectors;
circuitry for averaging the mean square error for the reference sectors;
circuitry for measuring mean square error for the sectors-under-test;
circuitry for averaging the mean square error for the sectors-under-test, wherein the averaged mean square error for the reference sectors and the averaged mean square error for the sectors-under-test are used to calculate the media thermal decay rate.

33. A method of measuring thermal decay rates at a plurality of locations on a disk surface in a disk drive, the method comprising the steps of:
providing a plurality of test tracks located at different locations on the disk surface, wherein each of the test tracks includes reference patterns in a plurality of reference sectors and sector-under-test patterns in a plurality of sectors-under-test, and wherein the reference sectors and sectors-under-test alternate with one another about at least a portion of at least one of the test tracks; and,
using the reference sectors and sectors-under-test to provide media thermal decay rates associated with the locations of the test tracks on the disk surface.

34. The method of claim 1, wherein the predetermined decay measurement duration is dependent upon the number of reference sectors.

35. The method of claim 1, wherein the disk drive includes a processor and wherein the predetermined decay measurement duration is dependent upon processor capabilities.

36. The method of claim 1, wherein the disk drive includes a spindle motor for rotating the disk surface at a spindle speed and wherein the predetermined decay measurement duration is dependent upon the spindle speed.

37. The method of claim 16, wherein the predetermined decay measurement duration is dependent upon the number of reference sectors.

38. The method of claim 16, wherein the disk drive includes a processor and wherein the predetermined decay measurement duration is dependent upon processor capabilities.

39. The method of claim 16, wherein the disk drive includes a spindle motor for rotating the disk surface at a spindle speed and wherein the predetermined decay measurement duration is dependent upon the spindle speed.

40. The method of claim 33, wherein the reference patterns include pseudo-random data.

41. The method of claim 33, wherien the sector-under-test patterns include pseudo-random data.

42. The method of claim 33, including the step of:
performing a temperature measurement to verify that the disk drive has been adequately warmed-up prior to determining the media thermal decay rates.

43. The method of claim 33, further including the step of:
predetermining a decay measurement duration.

44. Th method of claim 43, further including the steps of:
writing reference patterns in the plurality of reference sectors;
after at least two decades of time longer than the predetermined decay measurement duration have passed since writing the reference patterns, writing the sectors-under-test patterns.

45. The method of claim 44, further including the step of:
measuring mean square error for the reference sectors.

46. The method of claim 45, further including the step of: averaging the mean square error for the reference sectors.

47. The method of claim 44, further including the step of: measuring mean square error for the sectors-under-test.

48. The method of claim 47, further including the step of: averaging the mean square error for the sectors-under-test.

49. The method of claim 43, wherein the predetermined decay measurement duration is dependent upon the number of reference sectors.

50. The method of claim 43, wherein the disk drive includes a processor and wherein the predetermined decay measurement duration is dependent upon processor capabilities.

51. The method of claim 43, wherein the disk drive includes a spindle motor for rotating the disk surface at a spindle speed and wherein the predetermined decay measurement duration is dependent upon the spindle speed.

* * * * *